United States Patent [19]

Ryan

[11] Patent Number: 4,825,465
[45] Date of Patent: Apr. 25, 1989

[54] EXCLUSIONARY DEVICE FOR COUPLING PLURAL TELEPHONIC DEVICES TO A SINGLE CENTRAL OFFICE TRUNK

[75] Inventor: Donald J. Ryan, New Hartford, N.Y.

[73] Assignee: Telecommunication Concepts, Inc., New Hartford, N.Y.

[21] Appl. No.: 131,368

[22] Filed: Dec. 10, 1987

[51] Int. Cl.[4] .............................................. H04M 1/72
[52] U.S. Cl. ..................................... 379/399; 379/161; 379/184; 379/387; 379/100
[58] Field of Search ............... 379/387, 397, 161, 165, 379/156, 184, 93, 100, 399

[56] References Cited

U.S. PATENT DOCUMENTS

| | | | |
|---|---|---|---|
| 3,435,151 | 3/1969 | Russell | 379/161 |
| 3,906,416 | 9/1975 | Sprando | 335/128 |
| 3,961,144 | 6/1976 | Hirate | 379/161 |
| 3,962,534 | 6/1976 | Ogawa | 379/100 |
| 4,000,375 | 12/1976 | Kawamura | 379/184 |
| 4,218,590 | 8/1980 | Rasmussen et al. | 379/161 |
| 4,266,103 | 5/1981 | White | 379/161 |
| 4,444,999 | 4/1984 | Sparrevohn | 379/195 |

OTHER PUBLICATIONS

Telephony, Oct. 26, 1987.

*Primary Examiner*—James L. Dwyer
*Attorney, Agent, or Firm*—Wall and Roehrig

[57] ABSTRACT

A controller couples a modem or facsimile device to a telephone trunk or line and also connects another instrument or communications device to the same line so that the line can be shared without danger of the two devices interfering with one another. The line is divided into separate branches to connect to the two devices. Each branch has a line relay that senses line current in the tip and ring conductors of the respective branch when line current is present. A holding feature accommodates dial pulse interruptions in the line current and/or pulse signalling.

9 Claims, 2 Drawing Sheets

EXCLUSIONARY DEVICE FOR COUPLING PLURAL TELEPHONIC DEVICES TO A SINGLE CENTRAL OFFICE TRUNK

BACKGROUND OF THE INVENTION

This invention relates to telephone equipment and is more specifically directed to an exclusionary circuit or device, namely a device that permits two telephonic instruments or other devices to share a single communication circuit, such as a central office line or trunk. The invention is specifically directed to means whereby a pair of telephone devices share a common central office line without one device interrupting or interfering with the other. In practice, one of the devices can be a facsimile machine or computer modem, and the other can be a voice instrument, key system, or private branch exchange.

It is conventional wisdom to assign a dedicated telephone trunk to a computer modem or to a facsimile machine. This is viewed as necessary because inadvertent extraneous signals on the line can interfere with the transmission or reception of data or documents by the modem or facsimile machine. These extraneous signals can occur if another device, e.g. an extension instrument, comes on line while the facsimile machine or modem is connected. For that reason, a dedicated line is considered more desirable than a shared line. However, in practice, a dedicated trunk or line for a modem or facsimile machine is in use only a fraction of the business day, i.e. one or two percent of the time, or less. It would be highly desirable to use the telephone line for other purposes hen the facsimile machine or modem is not in use. However, if the phone line is shared between the modem or facsimile machine and another communication device, interference or interruptions can result in failed transmission of data or documents, unless an effective exclusion device is employed. Unfortunately, no such device has thus far been proposed or put into use.

A number of line exclusion features have been proposed, specifically in connection with key telephone equipment. Some of these are described in U.S. Pat. Nos. 3,961,144; 4,218,590; and 4,266,103. An automatic electronic disconnector for telephone equipment is described in U.S. Pat. No. 4,444,999. A facsimile machine with an automatic disconnect means is described in U.S. Pat. No. 3,962,534. An arrangement of branched telephone sets to share an incoming telephone line and which incorporates an exclusion feature is described in U.S. Pat. No. 3,435,151.

OBJECTS AND SUMMARY OF THE INVENTION

It is an object of this invention to provide an exclusion device to increase the cost-effectiveness of telephone service by permitting shared service on a dedicated or non-dedicated tone or pulse-dial telephone trunk or line.

It is another object of this invention to prevent the interruption of ongoing voice or data communication once a shared telephone line has been seized or accessed.

It is yet another object of this invention to provide the above features in a simple, straightforward, reliable, and relatively inexpensive circuit device which can be retrofitted by the customer into the customer's telephone equipment.

In accordance with an aspect of this invention, a line controller device is provided for automatically isolating a telephone trunk that is shared by first and second separate telephone line terminal devices. One of the devices can be, for example, a telephone key system or PBX, and the other device sharing the trunk or line can be a facsimile machine or modem. The controller includes a line input for coupling the tip and ring conductors of the telephone trunk line and dividing the same into first and second branches that respectively connect to the first and second devices. A first line isolation device cuts off the second communication device from the second branch when there is line current appearing on the first branch to indicate that the first device has assumed an off hook condition, while a second line isolation device cuts off the first communication device from the first branch when there is line current appearing on the second branch to indicate that the second device has assumed an off hook condition. The first and second line isolation devices can include bypass capacitors or other equivalent means for passing a.c. ringing signal current to both communications devices. The controller can also include a holding circuit to accommodate dial pulse interruptions. This circuit holds a respective one of the first and second line isolation devices in the appropriate state to maintain the branch cut off from the respective instrument when the other instrument has assumed an off hook condition, notwithstanding the appearance of dial pulse interruptions in the d.c. line current.

In one preferred embodiment, the first and second line isolation devices an be line current relays that each have a tip coil and a ring coil connected in series in the tip and ring conductors of their respective first and second branches, with associated, normally-closed tip and ring contact switches connected in series in the other of the branches. In another embodiment, a source of d.c. power is included to provide a d.c. voltage. This can be externally provided from a small power supply, or can be derived from the line voltage. In this embodiment, the first and second line current relays have normally-open contacts disposed in series with a respective time constant circuit formed of a charging resistor and a capacitor. These are connected cross the voltage of the d.c. source. The voltage across the capacitor is fed through a discharge resistor to a gate, trigger, or base electrode of a transistor that actuates the coil of a further relay. The latter has its contacts connected in series in the other of the two branches. This embodiment readily accommodates pulse or square wave ringing, and accommodates rotary or pulse dial interruptions in the line current.

The above and many other objects, features and advantages of this invention will be more fully understood from the ensuing description of preferred embodiments thereof, which should be considered in connection with the accompanying Drawings.

DETAILED DESCRIPTION OF THE PREFERRED EMBODIMENTS

Figure 1:
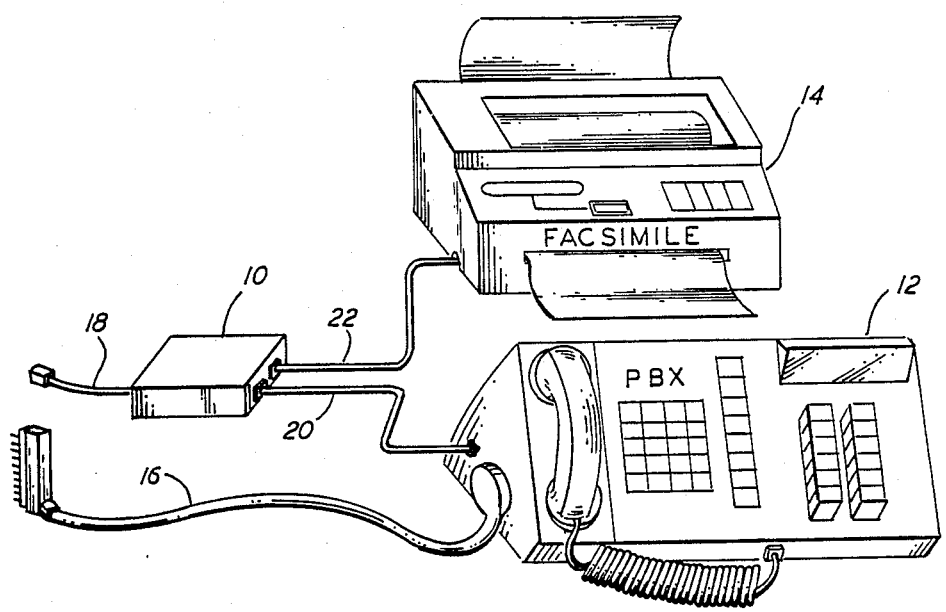
FIG. 1 is a perspective view of a system including two telephone line terminal devices sharing a single central office line or trunk.

With reference to the Drawing, and initially to FIG. 1 thereof, a modem/facsimile controller device 10 according to the present invention is shown connecting a first terminal telephone line communication device 12, here a PBX (as represented by an attendant's station) with a second device 14, here represented as a facsimile machine. A 24-pair cable 16 is shown connected to the PBX device 12, in typical fashion. In this example, there are six trunk lines, and lines one through five, as well as miscellaneous signalling and other communication lines, are carried on the cable 16. An input line 18 to the modem/facsimile controller 10 connects to the main distribution frame (not shown) and supplies a branch telephone line 20 which carries the conductors for trunk number six to the PBX device 12. Through another branch telephone cable 22 the controller 10 extends the same trunk line number six to the facsimile machine 14.

The modem/facsimile controller 10 ensures that only one of the two devices 12 and 14 can access this trunk line number six at any one time. When the facsimile machine 14 is sending or receiving a document, it is important that there be no noise or interruptions which might occur if another instrument or device sharing the telephone line were lifted off hook or if the line were otherwise accessed. If that should happen before the document is completely sent or received, at the least, errors would appear in the document, and in fact it may be necessary to retransmit. As mentioned previously, the current approach to preventing this is to employ only a dedicated line to the facsimile machine. However, the cost of the dedicated circuit can be quite high. It is preferred to share this circuit with a voice instrument, or with some other communications device, which can be, for example, a computer modem. In this way the trunk or line can be used for other purposes when the facsimile machine 14 is not being used.

Figure 2:
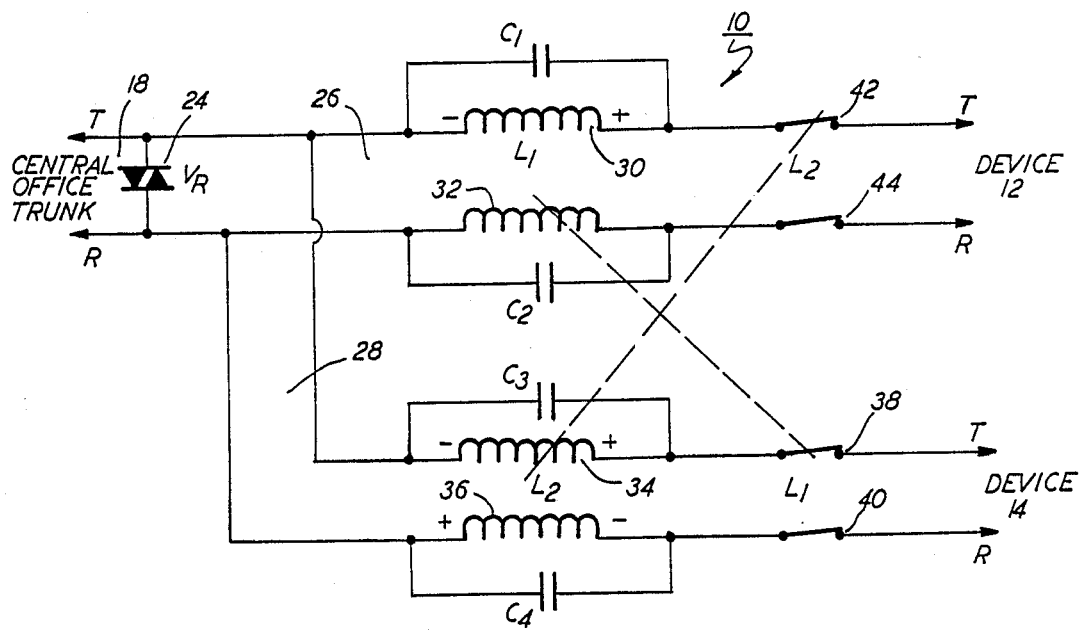
FIG. 2 is a circuit schematic diagram of a line controller device according to a first embodiment.

As shown in FIG. 2, a first preferred embodiment of the modem/facsimile controller 10 is employed on a Touch Tone or tone-dialing central office line, rather than a pulse dialing or "rotary" line.

Here, across the input line 18 is disposed an optional line protective device 24. Within the controller 10, the input line tip and ring conductors are divided to form separate tip and ring conductors of first and second branch circuits 26 and 28. These connect to the devices 12 and 14.

A first line relay L1 has a tip coil 30 and a ring coil 32. These are respectively disposed in series in the tip and ring conductors of the first branch circuit 26. A second line relay L2 has a tip coil 34 and a ring coil 36 respectively disposed in series in the tip and ring conductors of the second branch circuit 28.

Line relay L1 also has normally-closed contacts 38 and 40 in the tip and ring conductors of the second branch 26 while the line relay L2 has normally closed contacts 42 and 44 in the tip and ring conductors of the first branch 28.

With this arrangement, whenever the first communications device (i.e. device 12) assumes an off-hook condition, a line current flows through the coils 30 and 32 of the line relay L1. The latter sense this current and actuate the contacts 38 and 40 to an open state. This denies access by the second device (i.e. device 14) to the second branch circuit 28, and thence to the central office trunk line. Likewise, if the second device, i.e. the facsimile machine 14, assumes an off-hook condition, line current flows through the coils 34 and 36. This opens the contacts 42 and 44 of the line relay L2, and denies access to the first trunk 26 by the first device, i.e. the voice instrument or PBX 12. When both communications devices 12 and 14 assume an onhook condition, there is no current flowing through the coils of either line relay L1 or L2. The controller 10 then assumes an idle mode, i.e. with all contacts closed, as illustrated.

Also shown in this embodiment are bypass capacitors C1, C2, C3, and C4 connected in parallel across the coils 30, 32, 34, and 36 respectively. These capacitors C1 through C4 are of sufficient size (e.g. 1.0 microfarad with a working voltage of 250 volts) to prevent the coils 30–36 from opening the contacts 38–42 when a.c. ring current is received, but to permit the ring current to be passed to the devices 12 and 14 when the controller 10 is in its idle mode.

The line relays L1 and L2, for example, can be of the type described in U.S. Pat. No. 3,906,416, to accommodate a d.c. loop current on the order of about 19 ma or greater.

The modem/facsimile controller 10 can be contained in a housing dimensioned only about three inches long by three inches wide by about one to two inches deep. The controller 10 can be installed easily on any vacant space on the telephone equipment board in the equipment cabinet, or on a space on the wall near the central office trunk line to be controlled. Modular RJ11C connectors can be used for connecting the line cord 18 and the cords 20 and 22 to the communications terminal devices 12 and 14.

In addition to protecting a facsimile machine or computer modem, the controller device 10 can also be used for privacy between two extension instruments on the same line. The device 10 will cut off tee instrument that is not being used, but will permit ring signal to be transmitted to both instruments without closing either line relay L1 or L2.

Figure 3:
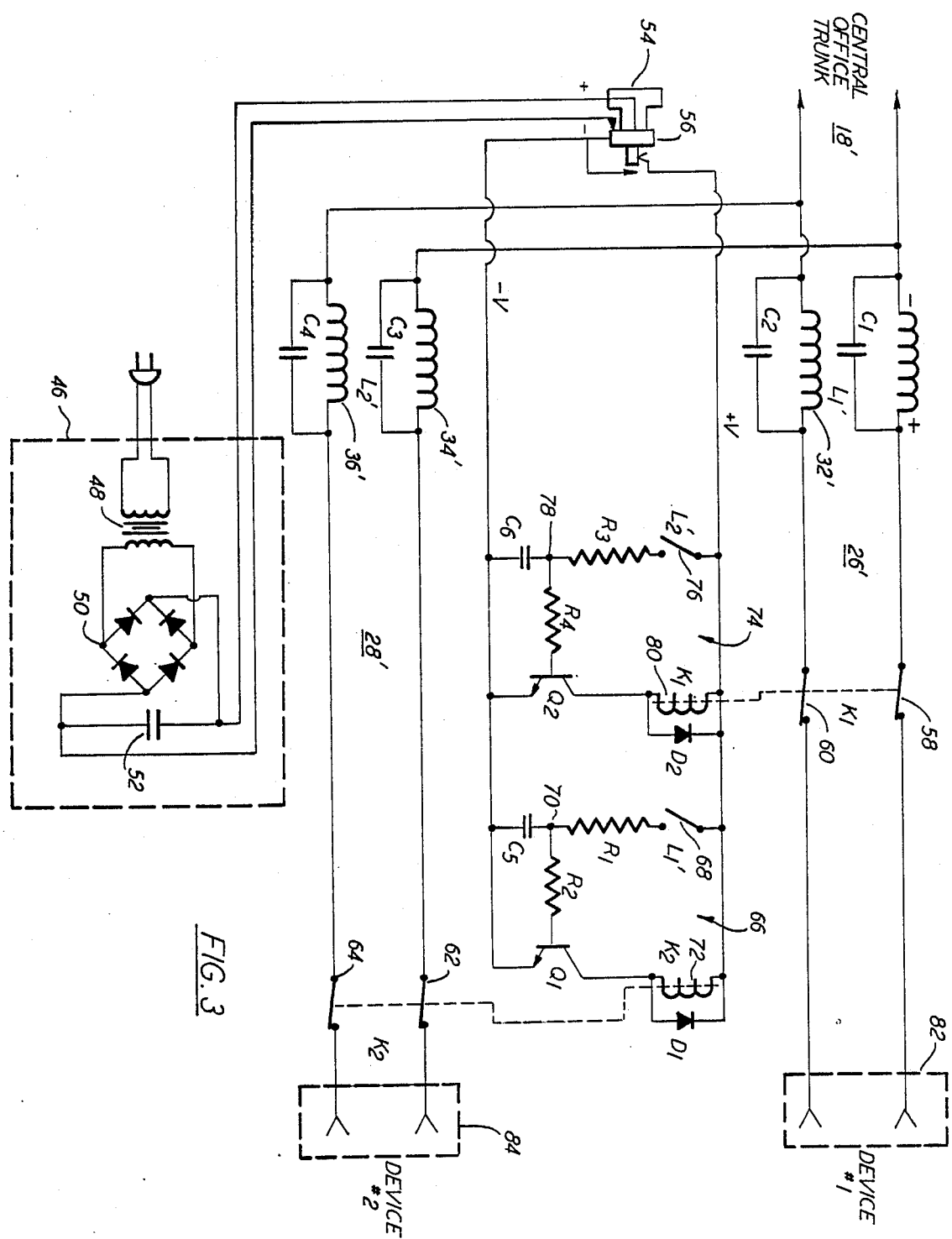
FIG. 3 is a circuit schematic diagram of a line controller device according to a second embodiment.

FIG. 3 illustrates a second embodiment of this invention, which can be used to accommodate rotary or pulse dialing, i.e. brief interruptions on the order of about 10 to 100 milliseconds in the d.c. line current. With this embodiment, such dial pulses will not disturb the operation of the controller. In the description of this embodiment, elements which correspond to similar elements in the first embodiment are identified with similar reference numbers, but primed, and to the extent that the structure is the same in both embodiments, a detailed description of those elements is omitted here.

As shown in FIG. 3, a source 46 of positive and negative d.c. voltage +V and −V, is formed of a step-down transformer 48 followed by a rectifier 50 and smoothing capacitor 52. The d.c. power is supplied through a plug 52 into a socket 56 which furnishes positive voltage +V and negative voltage −V, usually on the order of nine to twelve volts. This d.c. voltage supplies holding current to relays K1 and K2 to be described later.

In this embodiment, normally closed relay contacts 58 and 60 of the relay K1 are disposed in series on the tip and ring conductors of the first branch 26′, while normally-closed relay contacts of the relay K2 are disposed in series in the tip and ring conductors of the branch 28′. A holding circuit 66 is associated with the line relay L1′, which senses the presence of d.c. line current in the first branch 26′. This holding circuit 66 includes a normally-open contact switch 68 associated with the coils 30′ and 32′ of the relay L1′, a charging resistor R1 and a capacitor C5, with these three elements forming a series circuit between voltage +V to voltage −V. The resistor R1 and capacitor C5 define a junction 70 which supplies a control voltage to a base electrode of a switching transistor Q1 with a discharge resistor R2 being disposed between the base thereof and the junction 70. The emitter of the transistor Q1 is connected to the voltage −V and the collector thereof is connected through an actuating coil 72 of the relay K2 to the voltage +V. A protective diode D1 is connected in parallel with this coil 72.

In this embodiment, the transistor Q1 is a 2N 2222 NPN transistor, although any suitable transistor could be employed. Here, the resistors R1 and R2 have a value of 51K and the capacitor C5 has a value of ten microfarads.

When the coil 72 of the relay K2 is energized, the normally-closed contact switches 62 and 64 are actuated to an open condition, which cuts off the second device 14 from the branch 28'. The discharging time constant formed by the capacitor C5 and the discharging resistor R2 permits pulse dialing interruptions to occur in the line current that passes through the coils 30' and 32', without deenergizing the coil 72. The charging time constant that is formed between the charging resistor R1 and the capacitor C5 precludes pulse or square-wave ring signal from actuating the transistor Q1 and the coil 72.

A second holding circuit 74 which is similar to the first holding circuit 66, is associated with the normally-open contact 76 of the line relay L2' in the second branch 28'. This holding circuit 74 comprises a series circuit formed of the contact switch 76, a charging resistor R3 and a capacitor C6, the latter defining a junction 78 therebetween which is coupled through a discharging resistor R4 to the base of a switching transistor Q2. The collector of this transistor is connected through a coil 80 of the relay K1 to the voltage +V, and a diode D2 is disconnected in parallel to the coil 80.

The values of the resistors R3 and R4 are preferably the same as those of the resistors R1 and R2, and the value of the capacitor C6 is preferably the same as that of the capacitor C5. The coil 80, when actuated, opens the normally-closed contacts 58 and 60 in the first branch 26'.

As is further illustrated here, the branches 26' can terminate in modular output jacks 82 and 84 at a point downstream of the relay contact switches 58,60 and 62,64.

When, for example, the first device 12 assumes an offhook condition, a line current passes through the coils 30' and 32' of the line relay L1, which closes the contact 68. This permits the capacitor C5 to charge through the charging resistor R1 and switches on the transistor Q1, thereby actuating the coil 72. This opens the contact switches 62 and 64 of the relay K2 and isolates the second device 14 from the second branch 28' and thereby from the central office trunk. When the first device 14 assumes an on-hook condition, the charged capacitor C5 will discharge through the resistor R2 and through the base-emitter circuit of the transistor Q1. This deenergizes the coil 72, and permits the switch contacts 62 and 64 to resume their normally-closed condition.

As mentioned previously, the brief interruptions of the line current that are associated with dial pulses will not close the switch contacts 62 and 64, nor will the d.c. signalling pulses associated with square wave signalling or ringing be sufficient to open the switching contacts 62 and 64.

The holding circuit 74 operates in a manner that is completely symmetrical to that of the holding circuit 66, and thus need not be described in detail.

In addition to the preferred embodiment described in detail hereinabove, many variations can be constructed which would not depart from the main principles of this invention. For example, rather than have a separate d.c. power source 46 as illustrated in FIG. 3, the line voltage trickle charging device could be employed, connected directly to the central office trunk tip and ring conductors. Also, photooptical devices could be employed rather than the line relays L1' and L2'. The controller could also be constructed to accommodate three or more branches so that three or more devices could share less than that number of lines without interruptions. Further, the device according to the first embodiment (FIG. 2) could be constructed with relays L1 and L2 having sufficient mechanical inertia so that the brief interruptions owing to dial pulses would not affect its privacy or isolation function.

While the invention has been described in detail with respect to these embodiments, it should be understood that the invention is not limited to those specific embodiments. Rather, many modifications and variations could be constructed by those of skill in the art without departing from the scope and spirit of this invention, as defined in the appended claims.

I claim:

1. A line controller for automatically isolating first and second separate telephone line terminal devices that share a common telephone trunk line, comprising,
   input means for coupling to tip and ring conductors of said telephone trunk line, and dividing the same into first and second branches which respectively connect to said first and second devices;
   first line isolation means for cutting off the second device from the second branch when line current appears on the first branch to indicate that the first device has assumed an off-hook condition; and
   second line isolation means for cutting off the first device from the first branch when line current appears on the second branch to indicate that the second device has assumed an off-hook condition;
   wherein said first and second line isolation means each include a line relay device having a tip coil connected in series in the tip conductor of the associated branch and a ring coil connected in series in the ring conductor of said associated branch, and normally-closed tip and ring contacts actuated by the associated tip and ring coils and connected in series in the tip and ring conductors of the other of the first and second branches.

2. The line controller of claim 1 in which said first and second line isolation means include means for passing a.c. ringing current when both said first and second devices are in an on-hook condition without cutting off either of the first and second telephone line terminal devices.

3. The line controller of claim 1 which further comprises means for holding a respective one of the first and second devices cut off from its associated branch when the other of the devices has assumed an off-hook condition notwithstanding the appearance of dial pulse interruptions in the line current appearing in the one of the first and second branches associated with said other device.

4. The line controller of claim 1 in which said first line isolation means includes a first line current sensor in the associated first branch for sensing the appearance of a d.c. line current therein, and a first normally-closed isolation switch disposed in the second branch and actuated by the first line current sensor to cut off the second device when said first line current sensor device senses said d.c. current.

5. The line controller of claim 4 in which the second line isolation means includes a second line current sensor in the associated second branch for sensing the appearance of a d.c. line current therein, and a second normally closed isolation switch disposed in the first branch and actuated by the second line current sensor to cut off the first device when said second line current sensor device senses said d.c. current.

6. The line controller of claim 1 further comprising ringing signal bypass capacitors coupled in parallel with each of said tip and ring coils.

7. A line controller for automatically isolating a telephone trunk that is shared by first and second separate telephone line terminal devices, and which can accommodate either tone dialing or pulse dialing; comprising
input means for coupling to tip and ring conductors of said telephone trunk line and dividing the same into first and second branches which respectively connect to said first and second devices;
first line current sensing means for sensing d.c. line current on at least one of the tip and ring conductors of the first branch;
second line current sensing means for sensing d.c. line current on at least one of the tip and ring conductors of the second branch;
a source of d.c. power having positive and negative d.c. outputs;
a first holding circuit that includes a first holding relay coil and a switching element coupled to series therewith across said d.c. power source with the switching element having an actuating element, a control circuit connected across said power source outputs that includes a first switch device that changes from a normal to an actuated state in accordance with the sensing of d.c. line current by the first line current sensing means when said d.c. current appears on said first branch, and a time constant circuit connected in series with the first switch device and having an output coupled to the actuating electrode of the associated switching element to energize the first holding relay coil and to hold continue energizing the same if said first switching device reverts to its normal state for less than a predetermined period of time to accommodate pulse dialing interruptions in said d.c. line current;
a second holding circuit that includes a second holding relay coil and a switching element coupled in series therewith across said d.c. power source outputs with the switching element having an actuating element, and a control circuit coupled across said power source outputs that include a second switch device that changes from a normal to an actuated state in accordance with the sensing of d.c. line current by the second line current sensing means when said d.c. line current appears on said second branch, and a time constant circuit connected in series with said second switch device and having an output coupled to the actuating electrode of the associated switching element to energize said second holding relay coil and to continue energizing the same if said second switch device reverts to its normal state for less than a predetermined period of time to accommodate pulse dialing interruptions in said d.c. line current;
first normally-closed line switching means disposed in at least one of the tip and ring conductors of the first branch and actuated to an open condition by the second holding relay coil; and
second normally-closed line switching means disposed in at least one of the tip and ring conductors of the second branch and actuated to an open condition by the first holding relay coil.

8. The line controller of claim 7 wherein said time constant circuit means for each of the first and second holding circuits includes a charging resistor and a capacitor connected in series with the associated switch element, and a discharging resistor coupled between the associated actuating electrode and a junction of the associated capacitor.

9. The line controller of claim 7 in which said line current sensor means each include respective relay coils in series on the tip and ring conductors of the first and second branches, and further comprising respective bypass capacitors across said relay coils for passing a.c. ring current to said first and second telephone line terminal devices.

* * * * *